No. 608,818. Patented Aug. 9, 1898.
J. E. WINDLE.
CLOTH MEASURING MACHINE.
(Application filed July 26, 1897.)
(No Model.)

WITNESSES:
Edward F. Allen
Walter O. Lombard

INVENTOR.
John E. Windle,
by Crosby Gregory,
Attys.

UNITED STATES PATENT OFFICE.

JOHN E. WINDLE, OF WORCESTER, MASSACHUSETTS.

CLOTH-MEASURING MACHINE.

SPECIFICATION forming part of Letters Patent No. 608,818, dated August 9, 1898.

Application filed July 26, 1897. Serial No. 645,910. (No model.)

*To all whom it may concern:*

Be it known that I, JOHN E. WINDLE, of Worcester, county of Worcester, State of Massachusetts, have invented an Improvement in Cloth-Measuring Machines, of which the following description, in connection with the accompanying drawings, is a specification, like letters on the drawings representing like parts.

This invention has for its object the production of a novel cloth-measuring machine, the measuring device consisting of a spirally-grooved figured cylinder, said groove receiving a roller or other stud of a follower the position of which is changed as the said cylinder is rotated, the said follower stopping when the end of the piece has passed and indicating on the cylinder the number of yards.

Figure 1:
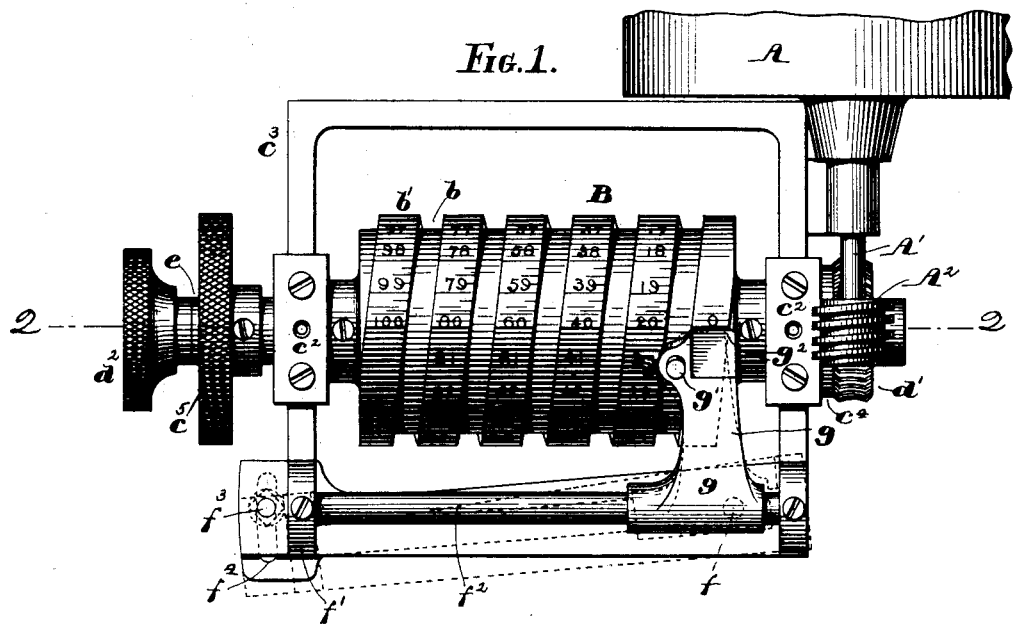
Figure 2:
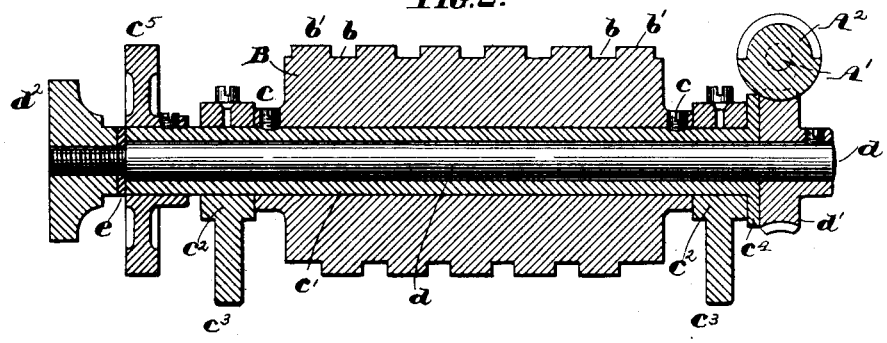
Figure 3:
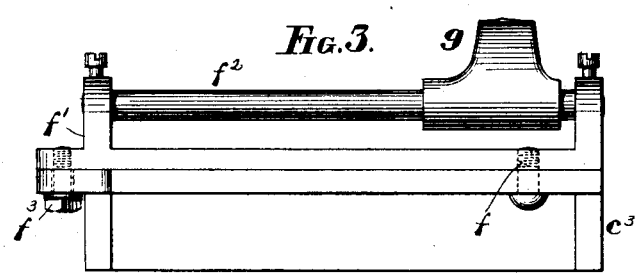

Figure 1 is a top or plan view of a sufficient portion of a measuring-machine with my improvements added to enable my invention to be understood. Fig. 2 is a section taken along the line 2 2, Fig. 1; and Fig. 3 is a detail of the follower, its guide-rod, and the adjustable frame by which said guide-rod is carried.

In the drawings, A indicates part of the usual cylinder over which the cloth to be measured passes during the measuring and winding operation, A' its shaft, and A² a worm thereon. This cylinder will and may be mounted, as usual, in any proper framework. (Not shown.)

The worm A² is the driver for the measuring device, to be described. This measuring device consists of a cylinder B, provided with a spiral groove $b$, leaving a spiral projection $b'$, which is figured from "0," the starting-point, to "100," which designates one hundred yards, the longest piece of cloth to be measured. This cylinder is secured by set-screws $c$ to a tubular or hollow shaft $c'$, free to turn in suitable bearings $c^2$ of a frame $c^3$, suitably supported alongside of the cylinder A. The hollow shaft has at one end a collar $c^4$ and near its other end a hand-wheel $c^5$ and receives through it a shaft $d$, having fast on it at one end a worm-toothed gear $d'$.

The end of shaft $d$ farthest from the worm-toothed gear is threaded and has screwed on it a set-nut $d^2$, the inner end of the set-nut acting against a washer $e$, resting against the end of the hollow shaft. When the set-nut is screwed tightly against said washer, the rotation of the worm effects the rotation of the hollow shaft and the cylinder B in common; but when said nut is not set up tight then the cylinder B may be turned by hand freely, to thereby put the said cylinder into position with its "0" mark at the desired and proper position for starting.

The frame part $c^3$ has pivoted on at $f$ a yoke $f'$, in which is mounted a guide-rod $f^2$, said guide-rod having mounted on it loosely a follower or indicating-finger $g$, provided with a roller or other stud $g'$ and an alining edge $g^2$. The yoke $f'$ may be turned about the pivot $f$ and be there held in adjusted position by a set-screw $f^3$ in a slot $f^4$. It will be evident that thus the alining edge $g^2$ is caused to travel either directly parallel to the axis of the cylinder B or obliquely thereto, according as the rod $f^2$ is in the position shown in full lines, Fig. 1, or is at an angle thereto, as shown, for instance, in dotted lines, Fig. 1, the object of this provision being that it may indicate measurements according to the predetermined marked units of the scale on cylinder B, or may add or subtract a constant increment or decrement therefrom when desired for any reason, one such reason being when the cylinder A has not the exact diameter for which the scale on $b'$ has been marked.

The full lines, Fig. 1, show the apparatus in its normal or starting position, the edge $g^2$ then standing in line with the "0" mark. As the cylinder A is rotated the cylinder B will also be rotated and the spiral groove will move the finger laterally, it always pointing to the figures representing the number of yards of cloth measured off, and after the contents of a piece of cloth has been indicated the cylinder is stopped and the finger by its position shows the number of yards of cloth in that piece. After a piece has been measured the nut $d^2$ is loosened and the cylinder turned about to its "0" point.

The dotted lines, Fig. 1, show the yoke adjusted for accurate work in measurement.

I am aware of Patent No. 551,180, in which a grooved drum is fixed by set-screws through its hub on a shaft rotated by a ratchet mechanism mounted on the shaft next to one hub of the drum, and I disclaim all features of invention therein shown.

Having described my invention, what I claim, and desire to secure by Letters Patent, is—

1. A cylinder adapted to be rotated by longitudinal movement of the web of material to be measured, an interior shaft, gearing between the shaft of the said cylinder and said interior shaft by which to rotate the latter shaft, a hollow shaft surrounding said interior shaft and provided with a flange, a measuring-cylinder fixed on said hollow shaft and provided with a spiral groove and a spirally-arranged series of figures, and means coöperating with said flange to quickly move one of said shafts longitudinally and thereby couple or uncouple said hollow and interior shafts as desired, combined with an indicating-finger moved by said spiral groove and coöperating with said figures, substantially as described.

2. A rotatable measuring-cylinder having a spiral groove and a spirally-arranged series of figures, combined with an indicating-finger having a suitable stud to coöperate with said groove, a guide-rod on which said finger slides, and means to move said guide-rod to adjust the path of movement of the finger and provide for accurate measurement, substantially as described.

3. A rotatable measuring-cylinder having a spirally-arranged series of figures thereon, combined with an indicator to coöperate therewith, a guide on which said indicator is movable in the direction of the length of the cylinder, means to effect movement of the indicator as the cylinder rotates, and means to adjust the guide angularly and thereby vary the path of the indicator, to provide for accurate measurement, substantially as described.

4. In a cloth-handling machine, the combination with a cylinder over which the cloth passes to be wound, of a measuring apparatus, comprising a worm fixed on the shaft of said cylinder, a second shaft journaled adjacent said cloth-cylinder shaft, a worm-wheel fixed on said second shaft, at one end, and a set-nut movable longitudinally on the other end thereof, a hollow shaft surrounding said second shaft and extending between and bearing against said worm and said set-nut for being locked thereby to rotate with the inclosed second shaft, a cylinder carried by said hollow shaft, a spirally-arranged scale on said cylinder, an indicating-finger arranged to follow said scale, means to move said finger longitudinally of the cylinder as the latter rotates, and means to vary the path of said longitudinal movement angularly relatively to the axis of the cylinder, as and for the purpose set forth.

In testimony whereof I have signed my name to this specification in the presence of two subscribing witnesses.

JOHN E. WINDLE.

Witnesses:
JOHN C. EDWARDS,
ADDIE F. DANIELS.